United States Patent
Smith et al.

(10) Patent No.: US 9,418,454 B1
(45) Date of Patent: Aug. 16, 2016

(54) GENERATING MARKUP ENCODINGS FOR THE COMPACT RENDERING OF CURVES IN INTERACTIVE GRAPHICAL DESIGNS

(71) Applicant: Axure Software Solutions, Inc., San Diego, CA (US)

(72) Inventors: Martin Smith, San Diego, CA (US); Victor Hsu, San Diego, CA (US); Joon Tan, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 0 days.

(21) Appl. No.: 14/807,122

(22) Filed: Jul. 23, 2015

(51) Int. Cl.
*G06F 17/00* (2006.01)
*G06T 11/20* (2006.01)
*G06F 17/22* (2006.01)
*G06F 17/21* (2006.01)

(52) U.S. Cl.
CPC .............. *G06T 11/203* (2013.01); *G06F 17/22* (2013.01); *G06F 17/218* (2013.01)

(58) Field of Classification Search
CPC .............. G06F 17/2241; G06F 17/245; G06F 17/30896; G06F 17/241; G06F 17/218
USPC ........... 715/230, 234, 273, 700, 237; 345/442
See application file for complete search history.

(56) References Cited

U.S. PATENT DOCUMENTS

| | | | |
|---|---|---|---|
| 5,826,025 A | 10/1998 | Gramlich | |
| 6,230,171 B1 | 5/2001 | Pacifici et al. | |
| 6,512,847 B1 | 1/2003 | Gnutzmann | |
| 6,571,295 B1 | 5/2003 | Sidana | |
| 7,042,457 B2 * | 5/2006 | Rosel | G06T 11/203 345/442 |
| 7,057,616 B2 * | 6/2006 | Motter | G06T 11/203 345/441 |
| 7,212,205 B2 * | 5/2007 | Uesaki | G06F 17/30 345/419 |
| 8,015,496 B1 | 9/2011 | Rogers | |
| 8,643,650 B1 * | 2/2014 | Vinchon | G06T 11/203 345/423 |
| 2005/0147300 A1 | 7/2005 | Dresevic et al. | |
| 2005/0183005 A1 | 8/2005 | Denoue et al. | |
| 2005/0289452 A1 | 12/2005 | Kashi et al. | |

(Continued)

FOREIGN PATENT DOCUMENTS

| | | |
|---|---|---|
| WO | 2001039019 A2 | 5/2001 |
| WO | 2004100071 A1 | 11/2004 |

OTHER PUBLICATIONS

Jang et al., A Sketch-based Interface to Modify and Reproduce Motion Sequences, Springer 2013, pp. 591-612.*
Vassilev et al., An Approach to 3D on the Web Using Java OpenGL, Google 2009, pp. 55-60.*

(Continued)

*Primary Examiner* — Cong-Lac Huynh
(74) *Attorney, Agent, or Firm* — The Mueller Law Office, P.C.

(57) ABSTRACT

Various methods and systems that involve systems generating encodings for the compact rendering of curves in interactive graphical designs are disclosed. One method is conducted by a processor and comprises providing an interactive graphical design to a memory. The method also comprises parsing the interactive graphical design to identify a curve having graphical information. The method also comprises decomposing the curve into a set of at least two curve components. The method also comprises generating a markup-coded representation of the interactive graphical design that includes a set of independent elements for rendering the curve, wherein each of the independent elements in the set of independent elements uniquely corresponds to a curve component in the set of at least two curve components.

24 Claims, 7 Drawing Sheets

(56) References Cited

U.S. PATENT DOCUMENTS

| | | | |
|---|---|---|---|
| 2006/0010368 A1 | 1/2006 | Kashi | |
| 2006/0031755 A1 | 2/2006 | Kashi | |
| 2006/0095884 A1* | 5/2006 | Skoll | G06F 17/5081 716/136 |
| 2006/0224950 A1 | 10/2006 | Takaai et al. | |
| 2008/0136838 A1 | 6/2008 | Goede et al. | |
| 2009/0204882 A1 | 8/2009 | Hollander et al. | |
| 2009/0287997 A1 | 11/2009 | Gordon et al. | |
| 2010/0053205 A1 | 3/2010 | Brandwein | |
| 2010/0194761 A1 | 8/2010 | Rhee | |
| 2011/0231782 A1 | 9/2011 | Rohrabaugh et al. | |
| 2012/0266061 A1* | 10/2012 | Williamson | G06F 17/2247 715/234 |
| 2012/0299932 A1 | 11/2012 | Cordara et al. | |
| 2012/0324332 A1* | 12/2012 | Zaragoza | G06F 9/4443 715/234 |
| 2014/0122992 A1 | 5/2014 | Woolf et al. | |
| 2014/0176560 A1 | 6/2014 | Mayot | |
| 2014/0337767 A1* | 11/2014 | Hsu | G06F 3/0484 715/760 |
| 2015/0169524 A1* | 6/2015 | Dayan | G06Q 10/101 715/201 |
| 2015/0193954 A1* | 7/2015 | Esfahbod Mirhosseinzadeh Sa | G06T 11/20 345/442 |
| 2015/0325030 A1* | 11/2015 | Witkin | G06T 13/40 345/473 |

OTHER PUBLICATIONS

Yao et al., Introduction to a Large-Scale General Purpose Ground Truth Database: Methodology, Annotation Tool and Benchmarks, Springer 2007, pp. 1-4.*

Lowther et al., Rendering + Modeling + Animation + Postprocessing = Computer Graphics, ACM 2000, pp. 21-29.* iMarkup—Annotation Functions, iMarkup Solutions, Inc., Web archived on Aug. 30, 2005, Accessed on: Jul. 13, 2015, http://web.archive.org/web/20050830041500/http://imarkup.com/products/annotate_page.asp.

iMarkup—Web Content Review, iMarkup Solutions, Inc., Archived on Aug. 31, 2005, Accessed on: Jul. 13, 2015, http://web.archive.org/web/20050831080913/http://imarkup.com/products/server_web_review.asp.

iMarkup and iMarkup Desktop, iMarkup Solutions, Inc., Archived on May 11, 2005, Accessed on: Jul. 13, 2015, http://web.archive.org/web/20050511193039/http://imarkup.com/docs/imarkup_client.pdf.

iMarkup Annotation User Guide, iMarkup Plug-in, iMarkup Solutions, Inc., Jan. 3, 2006, Accessed on: Jul. 13, 2015, http://web.archive.org/web/20060313093722/http:/www.imarkup.com/docs/.

iMarkup Product Documentation, iMarkup Solutions, Inc., Archived on Mar. 13, 2006, Accessed on: Jul. 13, 2015, http://web.archive.org/web/20060313093722/http:/www.imarkup.com/docs/.

iMarkup Server v6, End User Quick Start iMarkup Solutions, Inc., Jan. 4, 2006, Accessed on: Jul. 13, 2015, http://web.archive.org/web/20060313095526/http://www.imarkup.com/docs/QuickStart.pdf.

* cited by examiner

GENERATING MARKUP ENCODINGS FOR THE COMPACT RENDERING OF CURVES IN INTERACTIVE GRAPHICAL DESIGNS

BACKGROUND

Design programs for interactive graphical designs, such as web sites, allow users to specify designs while the designs are being rendered in a design environment. The underlying data structure used to render the editable version of the design in the design environment is generally in a different format than the underlying data structure that will be used to render the design itself in a player, such as a web browser. One basic reason that the formats differ is that the editable version of the design and the design itself expose different kinds of interactivity to the user: the editable version exposes interactivity that allows the user to specify and edit the design; and the design itself exposes interactivity to allow the user to interact with the design. For example, selecting a button in the editable version of a design (e.g., via the design environment) will move the focus of the design tool to the button in order to move the button or change its style, while selecting the same button in the rendered version of the design (e.g., via the player) will load a different page of the design. Another reason that the formats differ is that design environments are often proprietary tools while the designs created in said design environments are meant to be distributed widely to numerous potential players. As such, designs are often generated or exported from design environments in standard formats such as via code in a hypertext markup language.

Issues arise when designs are transferred back and forth between a design environment and player during production because certain aspects of the design are for production purposes only and might interfere with the interactivity of the design. For example, design annotations used to communicate potential changes to the design between members of a team that are collaborating on the design can be difficult to implement in the format of the exported design without interfering with the interactivity of the design. Annotations are particularly challenging in situations where the exported design is rendered using a markup language encoding because of the way standard players render markup language designs. Annotations are usually drawn over a design, but because of the way standard players render markup language designs, the annotations effectively block the interactivity of the design. In particular, hypertext markup language does not support interacting with portions of a design that have overlapping elements or containers. As a result, the production design either doesn't provide adequate room for annotations or doesn't allow full interactivity with the design.

Figure 1:
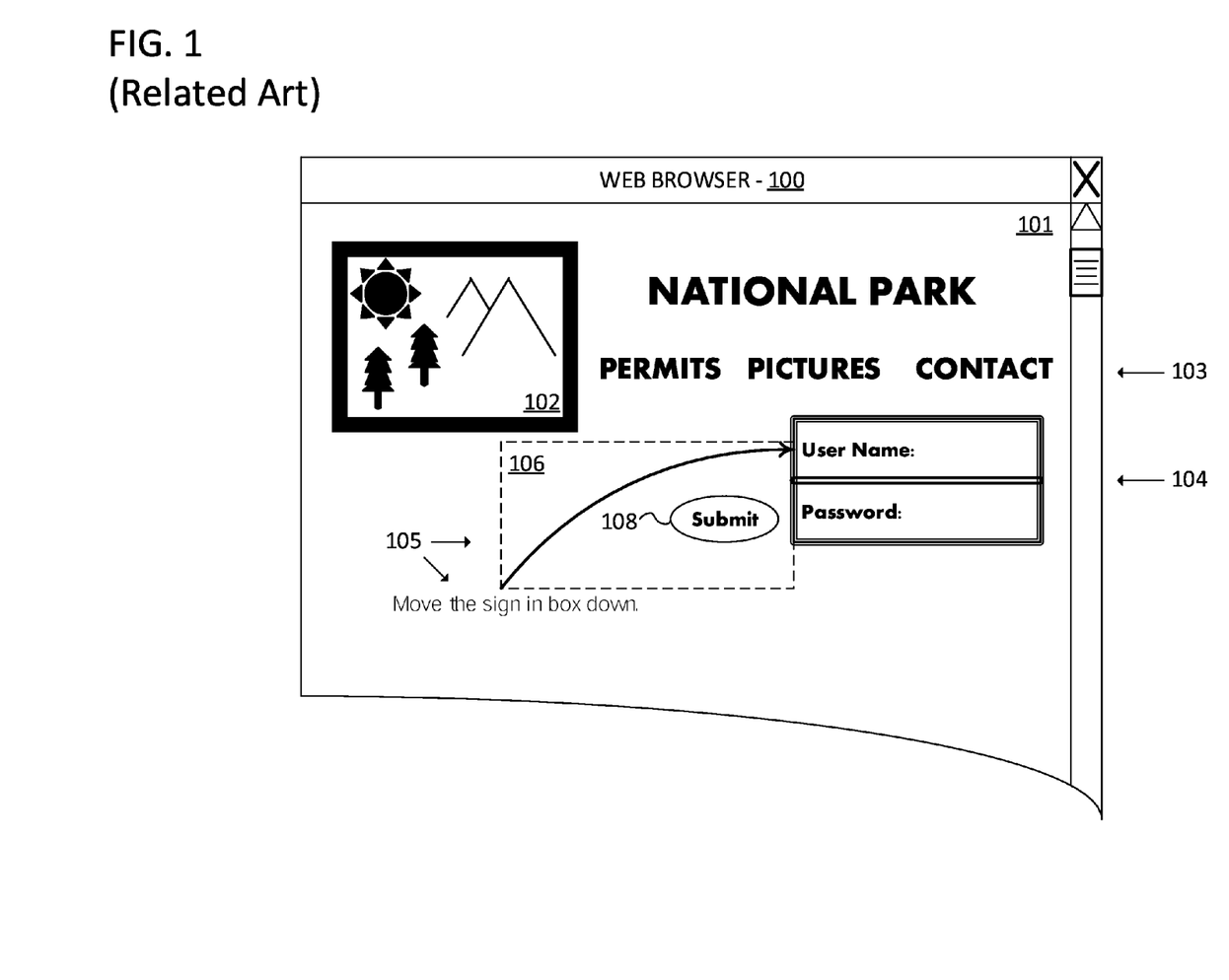
FIG. 1 illustrates the rendering of an annotation on a design using a markup-coded representation of the design and a web browser.

FIG. 1 illustrates rendering 101 of an interactive graphical design being rendered in a player 100 such as a web browser. The interactive graphical design includes several design elements such as a hero image 102, a menu of links 103, and a member login form 104. These elements could have been laid out in a graphical design environment by a designer using a drag and drop paradigm. Once the designer has completed the design, another member of the design team could review and annotate the design with annotation 105. Unfortunately, when annotation 105 is exported from the design environment as HTML for rendering in a browser, the curve of annotation 105 will be rendered as element 106, which has a footprint on the page as illustrated in FIG. 1 by a dashed line. Due to the limitations of rendering markup-coded representations of a design in standard browsers, the resulting element will cover button 108, and selection of button 108 will no longer be possible when annotation 105 is rendered with the design. As a result, the rendering of annotation 105 results in a loss of design interactivity which will hinder further review.

SUMMARY

In one embodiment a method is provided. The method comprises providing an interactive graphical design to a memory. The method also comprises parsing the interactive graphical design to identify a curve having graphical information. The method also comprises decomposing the curve into a set of at least two curve components. The method also comprises generating a markup-coded representation of the interactive graphical design that includes a set of independent elements for rendering the curve, wherein each of the independent elements in the set of independent elements uniquely corresponds to a curve component in the set of at least two curve components.

In another embodiment another method is provided. The method comprises receiving a user input via an interactive graphical design environment. The user input defines a graphical curve for an interactive graphical design. The method also comprises exporting the interactive graphical design from the interactive graphical design environment. The method also comprises decomposing the graphical curve into a set of at least two curve components. The method also comprises generating a coded representation of the interactive graphical design that includes a set of independent elements for rendering the curve. Each of the independent elements in the set of independent elements uniquely corresponds to a curve component in the set of at least two curve components. The method also comprises rendering the interactive graphical design in a player using the coded representation.

DETAILED DESCRIPTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

The following detailed description describes various systems and approaches for generating encodings for the compact rendering of curves in interactive graphical designs. Some of these approaches involve decomposing a curve into a set of curve components and generating a markup-coded representation of the interactive graphical design and the set of curve components. The curve components can be rendered using independent elements in the markup-coded representation of the interactive graphical design. The independent elements can be generated upon export of the design from a graphical design environment for rendering in an external player. The independent elements can be components of a proprietary model that is recognized by a specialized software element of the external player such as a plug-in or add-on to a standard web browser. The generation of the markup-coded representation can include formatting the set of independent elements for injection into a document object model (DOM) of the interactive graphical design. The generated markup-coded representation can thereby be parsed by a standard web browser such that the independent elements are recognized by and injected into the DOM. The DOM is recognized and utilized by a standard web browser to render the design and the independent elements. As used herein, the term "DOM" has its plain meaning to those of ordinary skill in the art of web browsers, and refers to a representation of the document as a structured group of elements that have properties and methods. The type of element and its properties determine whether and how it is rendered. The elements can also have event handlers to provide interactivity.

The described approaches can be utilized for the compact rendering of annotations on an interactive graphical design. In this case, the curves could be annotations on the interactive graphical design such as a line drawn across the design to bring attention to a particular design component or to illustrate a desired modification of the design or desired interactivity. When marking up a design with annotations, the reviewer making the annotations will thereby not need to be conscious of preserving the interactivity of the design. As such, when the design is rendered in a player, an annotation whose rendering might have otherwise obscured an interactive portion of the interactive graphical design will not do so. In other words, the annotation will be compactly rendered to expose an interactive portion of the interactive graphical design beneath the annotation.

The described approaches can also be utilized for the compact rendering of curves that are part of the graphical content of the interactive graphical design itself. Conventionally, curves in an interactive graphical design would be rendered as parts of the images in which they appear and would be blocked off from interactive elements for that reason. When a designer specifies the content of a page, the location of the curve relative to the interactive element would only need to be considered to the extent that the relative location of separate blocks of content were considered when laying out the overall page. However, if the design is specified in a graphical design environment that includes sketching tools, the designer may specify the design without any reference to the underlying markup language that will render the design. As such, if markup language code is automatically generated from the individual elements of the design, the potential for the overlap of elements as described with reference to FIG. 1 becomes a real possibility in the absence of additional processing steps. The approaches described herein also alleviate this concern and can serve as the additional processing steps needed to avoid the overlap of free form curves and other content that was separately specified for an interactive graphical design. By compactly rendering the curves of the design, the graphical design environment does not need to engage in complex determinations as to what elements of a design need to be grouped for non-overlapping rendering, and the code for rendering the curves of a design without interfering with the interactivity of the design can be efficiently generated.

Figure 2:
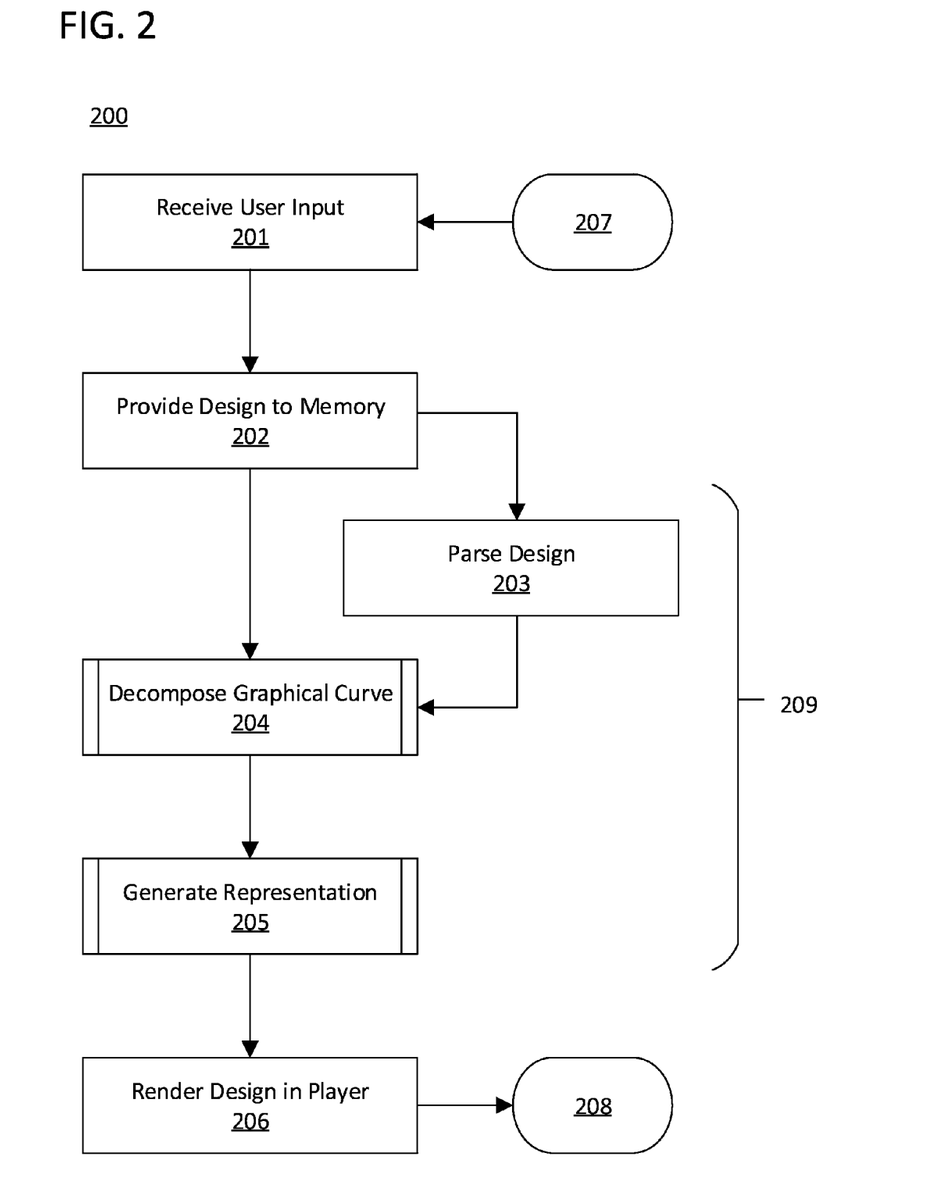
FIG. 2 is a flow chart that illustrates a set of methods for generating markup encodings for the compact rendering of curves in interactive graphical designs.

A set of methods for generating markup encodings for the compact rendering of curves in interactive graphical designs can be described with reference to flow chart 200 in FIG. 2. Further variations and specific implementations of these methods are provided with reference to FIGS. 3-6. The approaches described below include different algorithms for decomposing the curve into curve components, different implementations of the independent elements in the markup-coded representation of the design, and different algorithms for generating the markup-coded representation of the design given a set of curve components and target type of independent element for the markup-coded representation.

Flow chart 200 includes step 201, in which inputs 207 are received from a user via a graphical design environment. Input 207 refers to electronic signals received by a machine via human-machine interfaces such as a keyboard, mouse, gesture recognition device, or surface pen. The user can be a designer or other collaborator working on an interactive graphical design in the graphical design environment. The user input can define a graphical curve for an interactive graphical design. As an example, a user can use a mouse directed two-click-and-bend curve generation tool or a free form mouse-down-and-drag, curve generation tool. As another example, the user input can be an electronic signal received via a surface pen and processed by the graphical design environment back end software to encode the desired signal. This encoding of the graphical curve can be used to display the graphical curve back to the user as part of the design in the graphical design environment. The encoding can also be exposed for modification by additional user inputs to change the color, shape, position, and style of the graphical curve. The graphical curve can be an annotation placed on the design from within the graphical design environment. As another example, the user input can be an electronic signal received via a surface pen and processed by a player's back end software to encode the desired signal. The back end software could be a portion of a proprietary player or a plug-in on a standard player such as a web browser. This encoding of the graphical curve could be used to display the graphical curve back to the user as part of the design in the player. The encoding can also be exposed for modification by additional user inputs to change the color, shape, position, and style of the graphical curve.

Flow chart 200 also includes step 202, in which the interactive graphical design is provided to a memory. Once stored in memory, the interactive graphical design can be used to generate a markup-coded representation of the interactive graphical design, As such, the interactive graphical design can be considered the input to a method comprising variations of steps 203-205 wherein the output of such a method is the aforementioned markup-coded representation of the interactive graphical design. The design can be continuously provided to memory as the user is editing and specifying the design by the state machine that is instantiating the interactive graphical design environment. Alternatively, the design can be provided to memory from an external software system during an import process, such as when an interactive graphical design has been edited in an external tool and is being brought back into the graphical design environment.

Flow chart 200 also includes optional step 203, in which the interactive graphical design is parsed to identify a curve having graphical information. Step 203 is optional because its execution depends on the format in which the design is provided to memory and the operation of the back end software for the interactive graphical design environment. In particular, specific types of curves on which the design will operate may have already been tagged with a unique identifier that marks them as requiring the operation of a particular software element that will execute steps 204 and 205. However, in other approaches, the design will be parsed to identify graphical curves for which the rendering in compact format would provide a benefit to the design. As an example, the parsing action could involve a compiler conducting a specific process involving selecting only curves with an unprocessed area above a threshold and then further narrowing the selection to curves that cover interactive elements.

Flow chart 200 also includes steps 204 and 205, in which the graphical curve is decomposed into a set of at least two curve components and a markup-coded representation of the interactive design is generated, respectively. Steps 203, 204, and 205 can all be a part of an export process 209 for exporting the interactive graphical design from the graphical design environment. In some approaches, the at least two curve components will have the same graphical information as the original graphical curve such that the original curve can be rendered graphically in its entirety with access to the data represented by the curve components. In some approaches, the at least two curve components will have sufficient graphical information from the original graphical curve such that the semantic content of the original curve can be rendered graphically with access to the data represented by the curve components. Depending upon the specific implementation applied to decompose the curve in step 204, and the complexity of the curve itself, the number of curve components can be much greater than two. However, benefits accruing to the compact rendering of a curve using a markup language encoding will attach even when the number of curve components is limited to two. The curve components are each uniquely identifiable and editable data structures that can be operated upon by the compiler that is used to generate the markup-coded representation in step 205.

The markup-coded representation of the interactive graphical design that is generated in step 205 will include a set of independent elements for rendering the curve. These independent elements will each uniquely correspond to a curve component in the set of curve components to which the curve was decomposed in step 204. As the most basic example, two independent elements of the markup-coded representation that are used to render the graphical curve in a player will individually and uniquely correspond to two curve components into which the curve was decomposed in step 204. The independent elements can be separately enumerated HTML elements, such as <div>, <img>, or <canvas> elements or their equivalents in any markup language.

Flow chart 200 also includes step 206 in which the design is rendered in a player. The player can be a component of the interactive graphical design environment (e.g., for previewing designs), a standard web browser, or a proprietary player. In the case of a standard web browser, the player may include an add-on or plug-in used to accept annotations on the design or other input from reviewers. However, benefits accrue to situations in which the player is a standard web browser which thereby does not require any specialized add-on to render the design besides recognition of and adherence to the DOM.

Figure 3:
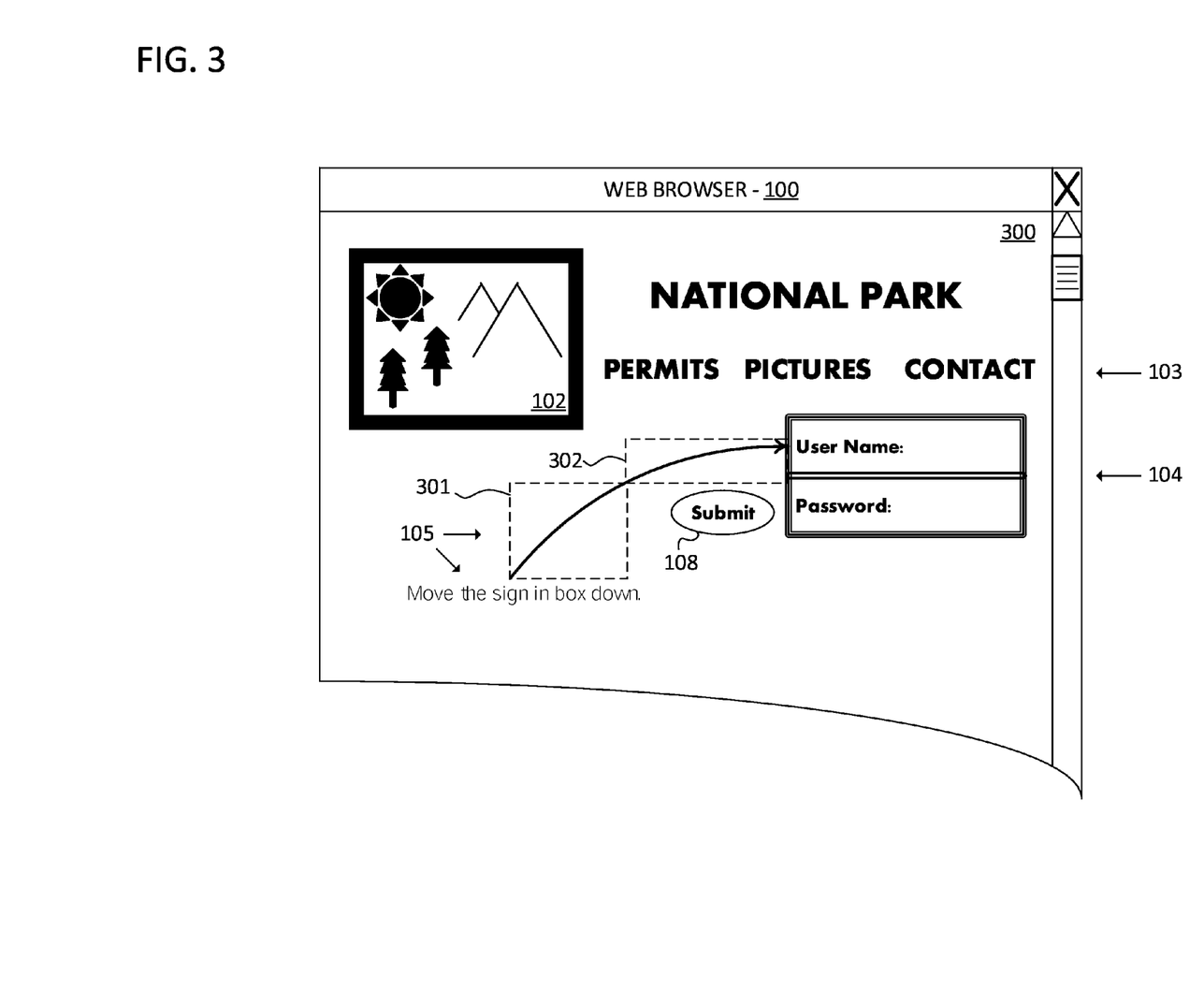
FIG. 3 illustrates the compact rendering of an annotation on a design using a markup-coded representation of the design and a web browser.

FIG. 3 illustrates the same interactive graphical design that is being rendered in web browser 100 in FIG. 1. However, rendering 300 of the interactive graphical design in FIG. 3 is being rendered from a markup-coded representation of the interactive design that was generated according to a method that is within the set of methods represented by flow chart 200. As a result, the curve of annotation 105 was decomposed into two curve components and is being rendered through the use of two independent elements in the markup-coded representation used to produce rendering 300. The curve components represented by these independent elements have the same graphical information as the original curve such that there is no change in the appearance of rendering 300 as compared to rendering 101. However, the footprint of these individual elements in the rendering, as represented by dashed areas 301 and 302, is far less that the footprint of the curve in rendering 101. As a result, the rendering of annotation 105 does not interfere with the interactivity provided by button 108 such that the graphical information provided by the annotation and the full interactivity of the design are both available to a reviewer.

Different specific approaches for conducting step 204 can be explained with reference to the illustrations and flow charts of FIGS. 4 and 5. In general, a graphical curve can be decomposed into curve components such that the sum of the area consumed by the minimum bounding rectangle (MBR) of each curve component is less than the area consumed by the MBR of the original curve. For example, the graphical curve can be decomposed by deriving a minimal set of Bezier curves that replicate the curve. Once the curve has been decomposed, each Bezier curve in the minimal set of Bezier curves will then uniquely corresponds to a curve component that is generated in the marked-coded representation of the design. As another example, the graphical curve can be decomposed by deriving a minimal set of paths having an MBR less than a predefined width that still cover the original curve.

Figure 4:
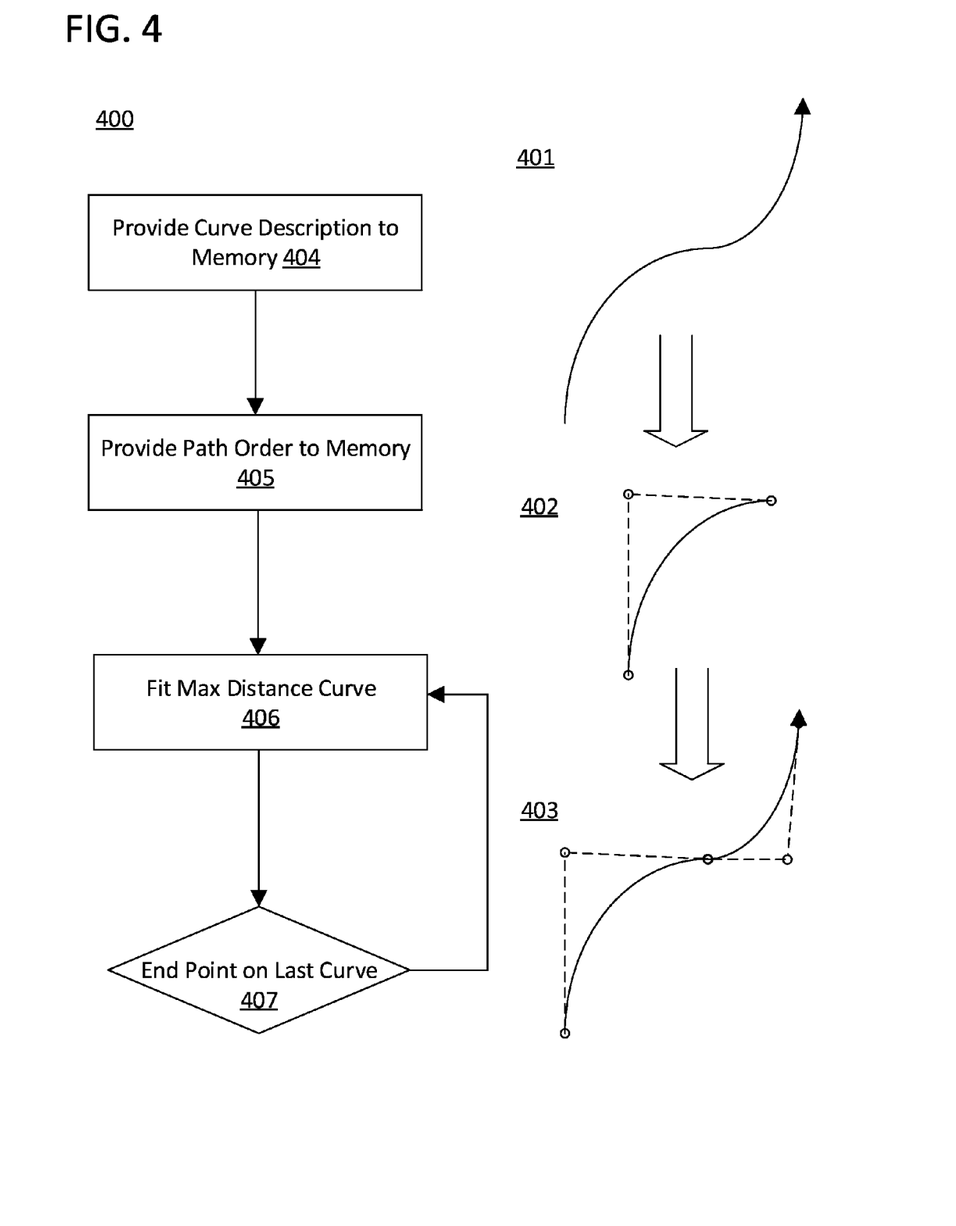
FIG. 4 includes a flow chart that illustrates a set of methods for decomposing a graphical curve into a set of Bezier curves and an illustration of the decomposition of a graphical curve into a set of quadratic Bezier curves.

FIG. 4 illustrates a set of methods for decomposing a graphical curve into a minimal set of Bezier curves with reference to flow chart 400 and illustrations 401, 402, and 403. In step 404, a description of the graphical curve is provided to memory. In step 405, a path order is provided to memory. With this data available, the curve can then be decomposed in step 406 by fitting the maximum distance curve of the given order along the original curve starting from the beginning end of the curve. The fit can be derived on an iterative basis by extending the end point of the curve component and determining where it is no longer possible to derive a Bezier curve of the given order to fit the original curve. This process is illustrated in a comparison of illustrations 401 and 402 where 401 illustrates the original curve and 402 illustrates the maximum quadratic Bezier curve that can adequately fit the original curve in step 406. Flow chart 400 ends with step 407, in which a check is run to determine if the end point of the original curve is the end point of the last curve component derived in step 406. If the end point has not been reached, the flow chart proceeds back to step 406 and continues to iterate between steps 406 and 407 until the end point of the curve has been reached. A full decomposition of the graphical curve from illustration 401 into curve components comprising quadratic Bezier curves is shown in illustration 403.

The path order selected in step 405 sets the order of the Bezier curves that will serve as the curve components of the decomposed curve. The order can be pulled from the source code of the graphical design environment, be determined by the user of the graphical design environment and pulled from a temporary storage location, or it can be derived through a script run on the curve description to determine the optimal value for the order. Increasing the order of the Bezier curves tends to degrade the benefit of later steps in the overall process of flow chart 200 as the MBR will include space that could have been optimized out of the overall footprint of the final derived curve. Although decreasing the order of the Bezier curves results in a larger number of curve components and a slightly larger number of independent elements that need to be derived, the increase in the data volume of the design and its correspondingly increased rendering and generating time is generally minimal compared to the benefit of decreasing the footprint of the annotation. Generally, a quadratic or cubic order will suffice for sufficiently compact rendering and the expedient generation of efficient code.

In other implementations, the path order from step 405 is a maximum value used to provide one limit to the curve fit step. The curve fit step of 406 could use the minimum order to fit a given curve and continue to increase in length and order until either the maximum value was reached or a given curve length was reached. The total area of the MBR could be an alternative limit for this approach in which, when the MBR was exceeded, a higher order was used for the Bezier curve until the MBR area decreased below a predetermined value.

Figure 5:
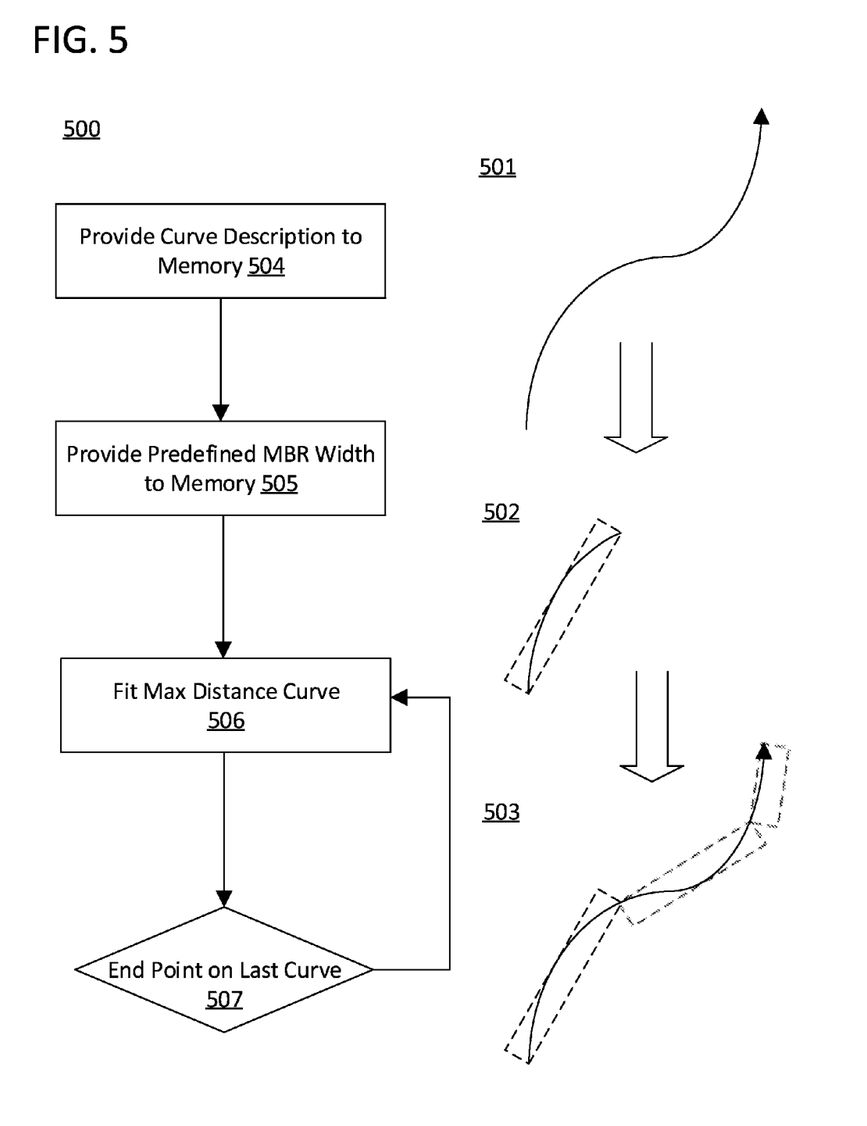
FIG. 5 includes a flow chart that illustrates a set of methods for decomposing a graphical curve into a set of curves components and an illustration of the decomposition of a graphical curve into a set of curve components having minimum bounding rectangles of a predefined width.

FIG. 5 illustrates a set of methods for decomposing a graphical curve into a minimal set of curve components where each component has an MBR with a width that is less than a predefined width, with reference to flow chart 500 and illustrations 501, 502, and 503. In step 504, a description of the graphical curve is provided to memory. In step 505, a predefined MBR width is provided to memory. With this data available, the curve can then be decomposed by fitting the maximum distance curve that will have a MBR less than the predefined MBR width and extending along the original curve starting from the beginning of the curve. This process can be conducted in step 506, which may involve taking the derivative of the curve utilizing the tangent of the curve at its starting point as a frame of reference. Alternatively, the process can include an iterative sub-process in which the length of the MBR is extended and the MBR is rotated through various angles until the curve component can no longer fit within its width. This process is illustrated in a comparison of illustrations 501 and 502 where 501 illustrates the original curve and 502 illustrates the maximum length MBR with a predetermined width that can adequately cover the first segment of the original curve in step 506. Flow chart 500 ends with step 507, in which a check is run to determine if the end point of the original curve is the end point of the last curve component derived in step 506. If the end point has not been reached, the flow chart proceeds back to step 506 and continues to iterate between steps 506 and 507 until the end point of the curve has been reached. A full decomposition of the graphical curve from illustration 501 into curve components comprising maximum length MBRs with a predetermined width is shown in illustration 503.

The target MBR width selected in step 505 can be specified in pixels or in accordance with any scaling scheme utilized within the graphical design environment. The width can be pulled from the source code of the graphical design environment, be determined by the user of the graphical design environment and pulled from a temporary storage location, or it can be derived through a script run on the curve description to determine the optimal value for the width. The optimal value can be derived based on minimizing the overall area of the component's MBRs counterbalanced with a desire to minimize the number of components as described above. The frontier of this optimization problem can be selected by a developer of the graphical design environment. For example, the frontier could be first order linear such that an increase in total MBR of 1,000 pixels was equivalent to the addition of another curve component. However, other frontiers could be selected including higher order frontiers and first order frontiers with different slopes such as 500-10,000 pixels.

An additional aspect of the decomposition process involves the treatment of line ends such as arrow heads and other symbols. Line ends can be automatically provided as a feature in the graphical design environment or may be entered manually by the person specifying the curve. For example, a user could apply an arrow head style to a line through a menu option, or manually draw in two additional lines at the end of the main line. The graphical design environment can tag the line ends as elements of the design that require their own independent elements for rendering. In this case, as long as the system keeps track of the line ends until their corresponding independent components are injected into the markup-coded representation, the line ends may be ignored during the decomposition process.

Once the decomposition process has been conducted, the result of that process can be utilized for the generation of a mark-up coded representation of the curve and the interactive design. The decomposed curve components can be used to generate a rendering that will utilize a proprietary model. For example, the curve components could be rendered using ActiveX, Silverlight, Adobe Flash, or other plug-in application frameworks. The generation of these renderings can render the curves as if they were on a separate level from the design itself. In some cases, this can involve the ability to interact with the design even if the area of interactivity is located below a curved segment of an annotation. In effect, the presence of the annotation on the design can be simulated and kept separate from the user's interaction with the design via the core of the web browser. In keeping with this approach, the plug-in could simulate the presence of the cursor over the design, intercept mouse clicks, and interact with the design indirectly by keeping track of what that mouse click would have done in the absence of the rendered curves. Although these approaches would facilitate the separation of interactivity from rendering of the curves in the design, there are certain benefits that accrue to approaches in which the curves are rendered using a DOM and not utilizing a separate semantic framework.

The markup-coded representation of the interactive design can be generated by leveraging a DOM such that the curves are rendered as if they were part of the interactive design. The generating can include injecting the set of independent elements into a DOM of the interactive graphical design. In the situation where the markup-coded representation is coded using HTML, this could involve creating independent HTML elements for each of the curve components into which the curve was decomposed. The generating can also involve generating a DOM element for each of the independent elements. For example, the generated markup-coded representation could include a <div> element to serve as a container in which each curve component was rendered. The <div> element, upon being recognized by the DOM, would be rendered at a specific location in a browser window as determined by the encoding and the DOM. Therefore, the curve components would be rendered as if they were part of the design itself, rather than being rendered on a separate layer or through the use of an alternative semantic platform.

Injecting the independent elements into the DOM provides benefits in terms of both efficiency and additional functionality, as the associated approaches both reduce the software requirements necessary to collaborate on a design and afford additional flexibility in terms of where annotations can be placed. Injecting the independent elements used to render the curve into the DOM reduces the software requirements necessary for collaborative efforts because the DOM is recognized by standard web browsers such that additional software is not required to review the design along with the associated annotations. As such, there is no need for reviewers to download and install additional software in order to review designs as they move through the production process. In addition, there is no need to maintain the add-ons so that they continue to function as standard web browsers evolve. Injecting the elements into the DOM also provides additional functionality in that the annotations can appear or disappear when elements of the design are dynamically shown or hidden. For example, if a design displayed either a log in interface or an account information interface, injecting annotations about each element into the encoding to appear on each of those interfaces would result in the annotations being displayed when those different interfaces were displayed. This allows reviewers to comment on and annotate different dynamic portions of a design. In contrast, if the annotations and design were kept on entirely separate layers, the annotations would not change when the state of the panel was modified and, as a result, it would not be possible to separately comment on the two panel states.

The independent elements in the generated representation of step 205 can be separate hypertext markup language elements having at least one hypertext markup language tag. The independent elements could consume a rectangular portion of a rendering space upon being rendered. The independent elements could include an attribute that rotates the independent elements for rendering. In one example, this attribute would be the HTML 5 "transform: rotate(X)" attribute. With reference to FIG. 5, it should be noted that the minimum width MBR decomposition method primes the compiler for the generation of these elements since the curve component derivation includes information on the degree of rotation and the alignment of that element to the curve. If instead a Bezier curve based decomposition method is used, the compiler will need to derive the MBR for each curve component in order to properly specify the size and degree of rotation of the independent elements used to render the curve components. However, this is a less intensive task than for the procedure in FIG. 5 because the length of each curve component is already known.

The separate hypertext markup language elements that can be used for rendering the curve include any element capable of referencing image data or graphical data more generally. For example, the independent elements could be image elements specified as <img src='X'>, where "X" is a referenced image file that includes a graphical representation of the curve component for that independent element. The independent elements could also be canvas elements specified as:

```
<canvas id="curveCanvas" width="200"
   height="200"></canvas>
<script>
var canvas=document.getElementByld('curveCanvas');
var context=canvas.getContext('2d');
contextbeginPath( )
context.moveTo(5, 5);
context.bezierCurveTo(140, 10, 180, 10, 180, 170);
context.lineWidth=5;
context.strokeStyle='black';
context.stroke( );
</script>
```

In this example, the JavaScript referenced by the <canvas> element renders the curve component in a rendering spaced defined by the <canvas> element. One potential benefit of this approach is that the curve could be dynamically altered using JavaScript in the player. For example, the color of the curve could be configured while rendering the design in the player. As another example, the independent elements could be container elements, such as a <div> element specified as <div style="width:200 px; height:200 px; background-image: url ("curve.gif"); background-position: 50 px 100 px;">. In this example, the cascading style sheet property of the element defines a portion of a background image for rendering in a rendering space defined by the container element. This approach is beneficial in that a single image file representing all of the various curve components is all that is needed for the markup-coded representation, which increases the speed at which the markup-coded representation can be transmitted through the Internet and rendered by a web browser.

Figure 6:
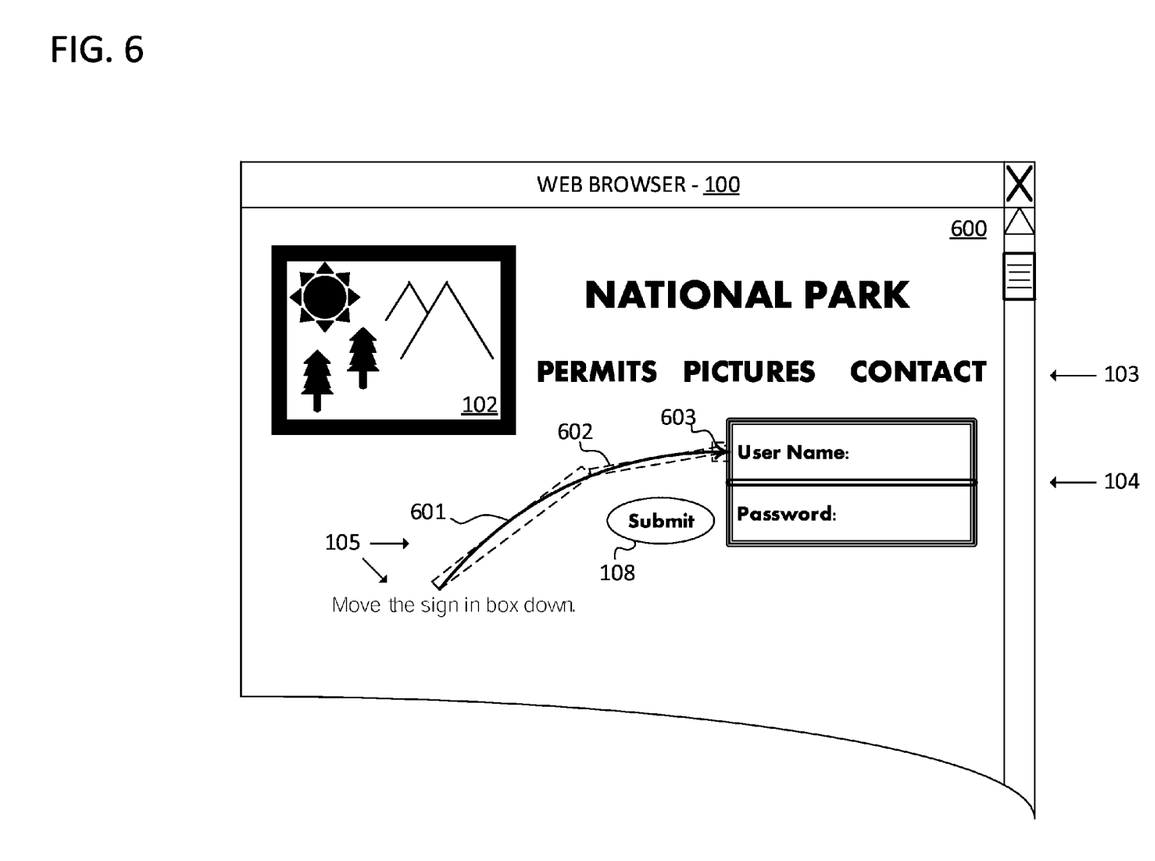
FIG. 6 illustrates the compact rendering of an annotation on a design using a web browser and a markup-coded representation of the design where the independent elements of the rendered curve include a "rotate" element.

FIG. 6 illustrates another rendering 600 of the same design and curve shown in FIGS. 1 and 3. As illustrated, the curve of annotation 105 is being rendered in accordance with a particular combination of the approaches described above. Specifically, the curve had been decomposed into minimum width MBR components 601 and 602 and is being rendered as <div> elements with a rotation element specified to minimize the footprint of each individual element. In addition, the curve end, which in this case is an arrow head, is being rendered as a separate div element 603. A comparison of the overall footprint of the curve in FIG. 1 and FIG. 6 illustrates that the curve rendering process could be applied to render a curve even if it were part of a highly interactive design with a high concentration of interactive points in the rendering space.

Although examples discussed above were directed to the generation of a markup-coded representation of a curve via the exporting of that graphical design and annotation from a graphical design environment, the approaches described herein are broadly applicable for the rendering of compact curves in any markup-coded representation of a graphical design regardless of where or how the curve was added to the design. For example, as introduced previously with respect to step 201 in flow chart 200, the curve could be an annotation added to a design in a specialized player that provides reviewers with the ability to markup or add annotations to a design, where the design is then subsequently imported along with those annotations into a graphical design environment. The annotation could be compactly generated in a markup-coded representation as part of the design during the import process, either after the player receives the annotation input and adds the annotation to the design in the player, or during a subsequent export of the design from the graphical design environment at a later time.

Although examples discussed above were directed to the generation of a markup coded representation of an annotation on a graphical design, the approaches described herein are broadly applicable for the rendering of compact curves regardless of what the semantic content of the curve happens to be. For example, the curve does not have to be an annotation but can also be a curve whose semantic content is a part of the actual design itself. For example, the curve could be an illustration added to the design by a graphical designer adding additional artistic elements to a design after the interactivity was specified by a different user. Due to the ability of the described approaches to compactly render this curve, the work of the graphical designer and the user interface designer working on the interactivity of the design can be conducted in a more flexible manner without each of them having to make adjustments for the other's efforts, thereby facilitating a more liquid collaborative effort for the production of the overall interactive graphical design.

Figure 7:
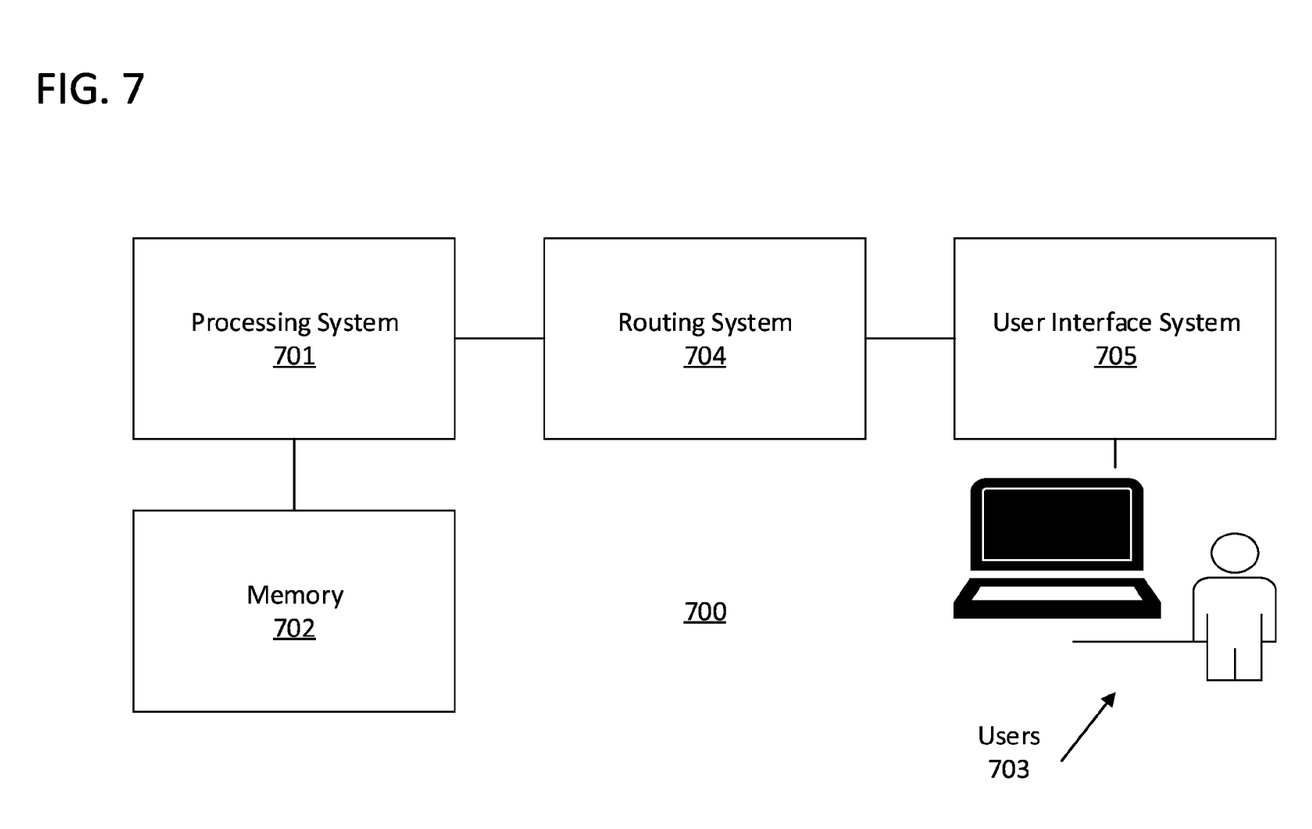
FIG. 7 is a block diagram of a computer system that can be used in accordance with embodiments described herein.

Any of the methods described herein can be conducted through the use of a computer system 700 as shown in FIG. 7. For example, the design environment could be provided by a processing system 701 acting in tandem with a memory 702. A user 703 would be able to access the design environment through the use of a routing system 704 and a user interface system 705. Any method steps involving providing or accepting things to and from a user can be conducted using interface system 705. Any method steps involving executing an action can be conducted using processing system 701 alone or in combination with memory 702. FIG. 7 is only an illustrative computer system that is amenable to operation in accordance with embodiments of the present invention and variant computer system topologies may be used in its stead. Nothing in this description should limit the processor of processing system 701 to a single processor, as the function of this block can be accomplished by multiple physical processors located either on a single work station or server, or distributed through a network. It is not essential for memory 702 to be physically distinguishable from processing system 701, as they are merely illustrated as separate blocks for purposes of invoking common conceptions of how computing systems operate. Routing system 704 could be the internal routing system of a single work station, a LAN, a WAN, a wired or wireless network, the Internet, or any other system capable of routing signals. User interface system 705 could be a work station, a computer, a mobile phone or other mobile device, or any computing device or group of computing devices capable of receiving inputs from a single user or group of users. FIG. 7 should also not be taken to indicate that the invention can only involve design environments or design programs that may only be accessed by one user as there could be multiple users 703 and that group of multiple users 703 could access the design environment using any number of routing systems 704. Those users could also access the design environment simultaneously. The steps of the various flow charts in the examples above can be executed by the processing system of FIG. 7 executing instructions to implement the objectives of those steps. The instructions can be encoded and stored on a non-transitory computer readable storage medium. Non-limiting examples of such non-transitory computer readable storage media include binary computer code stored in CD-ROM, hard disk drives, flash drives, or any computerized RAM. The code could be stored as a .exe or .dmg file. Non-transitory computer readable storage media can also include any file that is stored on a server in volatile or non-volatile memory and prepared for transmission via FTP, HTTP, or HTTPS.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method conducted by a processor, the method comprising:
    providing an interactive graphical design to a memory;
    parsing the interactive graphical design to identify a curve having graphical information;
    decomposing the curve into a set of at least two curve components; and
    generating a markup-coded representation of the interactive graphical design that includes a set of independent elements for rendering the curve, wherein each of the independent elements in the set of independent elements uniquely corresponds to a curve component in the set of at least two curve components.

2. The method of claim 1, wherein the generating comprises:
    formatting the set of independent elements for injection into a document object model of the interactive graphical design;
    wherein the markup-coded representation is coded using a hypertext markup language.

3. The method of claim 1, wherein the decomposing comprises:
    deriving a set of Bezier curves that replicate the curve;
    wherein each Bezier curve in the set of Bezier curves uniquely corresponds to a curve component in the set of at least two curve components.

4. The method of claim 1, wherein the decomposing comprises:
    deriving a minimal set of paths that replicate the curve;
    wherein each path in the minimal set of paths has a minimum bounding rectangle having a width that is less than a predefined width; and
    wherein each path in the minimal set of paths uniquely corresponds to a curve component in the set of at least two curve components.

5. The method of claim 1, wherein:
    each independent element in the set of independent elements is a separate hypertext markup language element having at least one hypertext markup language tag.

6. The method of claim 5, wherein:
    each independent element in the set of independent elements consumes a rectangular portion of a rendering space upon being rendered; and
    each independent element in the set of independent elements includes an attribute that rotates the independent element for rendering.

7. The method of claim 6, wherein:
    each independent element in the set of independent elements is a hypertext markup language <canvas> element and a JavaScript script; and
    the JavaScript script renders a curve component in a rendering space defined by the hypertext markup language <canvas> element.

8. The method of claim 6, wherein:
    each independent element in the set of independent elements is a hypertext markup language <img> element.

9. The method of claim 6, wherein:
    each independent element in the set of independent elements is a hypertext markup language <div> element with a cascading style sheet property; and
    the cascading style sheet property defines a portion of a background image to be rendered in a rendering space defined by the hypertext markup language <div> element.

10. The method of claim 6, wherein:
    the curve is an annotation on the interactive graphical design.

11. A method comprising:
    receiving a user input via an interactive graphical design environment, wherein the user input defines a graphical curve for an interactive graphical design;
    exporting the interactive graphical design from the interactive graphical design environment;
    decomposing the graphical curve into a set of at least two curve components,
    generating a coded representation of the interactive graphical design that includes a set of independent elements for rendering the curve, wherein each independent element in the set of independent elements uniquely corresponds to a curve component in the set of at least two curve components; and rendering the interactive graphical design in a player using the coded representation.

12. The method of claim 11, wherein the generating comprises:

generating a document object model element for each independent element in the set of independent elements;

wherein the player is a web browser; and wherein the document object model is recognized by the web browser.

13. The method of claim 12, wherein the decomposing comprises:

deriving a minimal set of Bezier curves that replicate the curve;

wherein each Bezier curve in the minimal set of Bezier curves uniquely corresponds to a curve component in the set of at least two curve components.

14. The method of claim 12, wherein the decomposing comprises:

deriving a minimal set of paths that replicate the curve;

wherein each path in the minimal set of paths has a minimum bounding rectangle having a width that is less than a predefined width; and wherein each path in the minimal set of paths uniquely corresponds to a curve component in the set of at least two curve components.

15. The method of claim 12, wherein:

each independent element in the set of independent elements is a separate hypertext markup language element having at least one hypertext markup language tag.

16. The method of claim 12, wherein:

each independent element in the set of independent elements consumes a rectangular portion of a rendering space upon being rendered; and each independent element in the set of independent elements includes an attribute that rotates the independent element for rendering.

17. The method of claim 16, wherein:

each independent element in the set of independent elements is a hypertext markup language <canvas> element and a JavaScript script; and the JavaScript script renders a curve component in a rendering space defined by the hypertext markup language <canvas> element.

18. The method of claim 16, wherein:

each independent element in the set of independent elements is a hypertext markup language <img> element.

19. The method of claim 16, wherein:

each independent element in the set of independent elements is a hypertext markup language <div> element with a cascading style sheet property; and the cascading style sheet property defines a portion of a background image to be rendered in a rendering space defined by the hypertext markup language <div> element.

20. The method of claim 16, wherein:

the curve is an annotation on the interactive graphical design.

21. A non-transitory computer readable storage medium having data stored therein representing instructions executable by a computer, the storage medium comprising:

instructions to parse an interactive graphical design to identify a curve having graphical information;

instructions to decompose the curve into a set of at least two curve components; and instructions to generate a markup-coded representation of the interactive graphical design that includes a set of independent elements for rendering the curve, wherein each independent element in the set of independent elements uniquely corresponds to a curve component in the set of at least two curve components.

22. The non-transitory computer readable storage medium of claim 21, the storage medium further comprising:

instructions for formatting the set of independent elements for injection into a document object model of the interactive graphical design;

wherein the markup-coded representation is coded using a hypertext markup language.

23. The non-transitory computer readable storage medium of claim 21, wherein:

each independent element in the set of independent elements consumes a rectangular portion of a rendering space upon being rendered; and each independent element in the set of independent elements includes an attribute that rotates the independent element for rendering.

24. The non-transitory computer readable storage medium of claim 21, wherein:

the curve is an annotation on the interactive graphical design.

* * * * *